United States Patent
Umeda et al.

(10) Patent No.: US 10,744,935 B2
(45) Date of Patent: Aug. 18, 2020

(54) CUP HOLDER

(71) Applicant: TOYODA GOSEI CO., LTD., Kiyosu-shi, Aichi-ken (JP)

(72) Inventors: Yukihiko Umeda, Kiyosu (JP); Shinichi Ogawa, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/004,640

(22) Filed: Jun. 11, 2018

(65) Prior Publication Data
US 2018/0370428 A1 Dec. 27, 2018

(30) Foreign Application Priority Data
Jun. 23, 2017 (JP) ................... 2017-123520

(51) Int. Cl.
| | |
|---|---|
| *B60Q 3/20* | (2017.01) |
| *F21V 7/00* | (2006.01) |
| *B60N 3/10* | (2006.01) |
| *B60Q 3/60* | (2017.01) |
| *B60Q 3/225* | (2017.01) |
| *B60Q 3/64* | (2017.01) |
| *F21V 8/00* | (2006.01) |

(52) U.S. Cl.
CPC ............... *B60Q 3/20* (2017.02); *B60N 3/101* (2013.01); *B60Q 3/225* (2017.02); *B60Q 3/60* (2017.02); *B60Q 3/64* (2017.02); *F21V 7/0008* (2013.01); *F21V 7/0041* (2013.01); *G02B 6/0018* (2013.01)

(58) Field of Classification Search
CPC ...................................................... B60Q 3/20
See application file for complete search history.

(56) References Cited

U.S. PATENT DOCUMENTS

| | | | |
|---|---|---|---|
| 2008/0266853 A1 | 10/2008 | Goto | |
| 2011/0037287 A1* | 2/2011 | Penner | B60N 3/101 296/37.8 |
| 2012/0075842 A1* | 3/2012 | Goto | B60N 3/101 362/154 |

FOREIGN PATENT DOCUMENTS

| | | |
|---|---|---|
| JP | 2008-247090 A | 10/2008 |
| JP | 2009-161157 A | 7/2009 |
| JP | 2010-132201 A | 6/2010 |
| WO | 2008/133903 A1 | 11/2008 |

OTHER PUBLICATIONS

Office Action dated May 26, 2020 in issued on corresponding JP application No. 2017-123520 (with English translation).

* cited by examiner

*Primary Examiner* — Joseph L Williams
*Assistant Examiner* — Jacob R Stern
(74) *Attorney, Agent, or Firm* — Posz Law Group, PLC (57) ABSTRACT

A cup holder includes first and second concave housing portions to house a cup, and a light source to illuminate a bottom portion of the first housing portion and a bottom portion of the second housing portion. The light source is placed between the first housing portion and the second housing portion and at a higher position than the bottom portion of the first housing portion and the bottom portion of the second housing portion. The cup holder is configured such that light emitted from the light source provides an illuminance of the bottom portion of the first housing portion that is more than an illuminance of the bottom portion of the second housing portion.

4 Claims, 6 Drawing Sheets

CUP HOLDER

The present application is based on Japanese patent application No. 2017-123520 filed on Jun. 23, 2017, the entire contents of which are incorporated herein by reference.

BACKGROUND OF THE INVENTION

1. Field of the Invention

This invention relates to a cup holder and, in particular, a cup holder installed in a vehicle interior etc.

2. Description of the Related Art

A cup holder is known which is installed in a console box, a front surface of instrument panel etc. in a vehicle interior, is convenient to temporarily hold a drink bottle such as a plastic bottle and a beverage can, and is provided with a light source for increasing its visibility at night and decorative effect of its cup housing portion (see e.g., JP 2010/132201 A and WO 2008/133903 A).

The cup holder described in JP 2010/132201 A is provided with two cup housing portions for housing cups, two circular light guide members attached to the openings of the two cup housing portions, and two light sources for supplying light and illuminating the two light guide members.

The cup holder described in WO 2008/133903 A is provided with two cup housing portions for housing cups, a transparent ring continuously provided at an edge of openings of the two cup housing portions, and a light source for supplying light and illuminating.

SUMMARY OF THE INVENTION

The cup holder of JP 2010/132201 A may need the two light sources to illuminate the two cup housing portions. In contrast, the cup holder of WO 2008/133903 A allows the single light source to illuminate the two cup housing portions. However, since the two cup housing portions are equally illuminated in illuminance, the two cup housing portions may be difficult to visually distinguish from each other in a dark vehicle interior.

It is an object of the invention to provide a cup holder that allows the easy visual distinction between the two cup housing portions upon illumination even if a single light source is used.

According to an embodiment of the invention, a cup holder defined by [1] to [6] below is provided.

[1] A cup holder, comprising:
first and second concave housing portions to house a cup; and
a light source to illuminate a bottom portion of the first housing portion and a bottom portion of the second housing portion, the light source being placed between the first housing portion and the second housing portion and at a higher position than the bottom portion of the first housing portion and the bottom portion of the second housing portion,
wherein the cup holder is configured such that light emitted from the light source provides an illuminance of the bottom portion of the first housing portion that is more than an illuminance of the bottom portion of the second housing portion.

[2] The cup holder according to [1], wherein a height of the bottom portion of the first housing portion is higher than a height of the bottom portion of the second housing portion.

[3] The cup holder according to [1] or [2], further comprising a light guide lens above the light source that guides light emitted from the light source to the bottom portion of the first housing portion and the bottom portion of the second housing portion,
wherein the light guide lens comprises a plain plate light guide lens comprising a first region that is located closer to the first housing portion than a center of the light guide lens and that is operable to guide light emitted from the light source and entered into the light guide lens to the bottom portion of the first housing portion, and a second region that is located closer to the second housing portion than the center of the light guide lens and that is operable to guide light emitted from the light source and entered into the light guide lens to the bottom portion of the second housing portion, and
wherein the first and second regions of the light guide lens are formed asymmetrical to each other.

[4] The cup holder according to any one of [1] to [3], wherein an area of an opening through which a region with the light source installed therein spatially communicates with the first housing portion is more than an area of an opening through which the region with the light source installed therein spatially communicates with the second housing portion.

[5] The cup holder according to any one of [1] to [4], wherein the light source is located closer to the first housing portion than the second housing portion.

[6] The cup holder according to any one of [1] to [5], wherein the light source comprises a single light source.

Effects of the Invention

According to an embodiment of the invention, a cup holder can be provided that allows the easy visual distinction between the two cup housing portions upon illumination even if a single light source is used.

BRIEF DESCRIPTION OF THE DRAWINGS

Next, the present invention will be explained in conjunction with appended drawings, wherein.

DETAILED DESCRIPTION OF THE PREFERRED EMBODIMENTS

First Embodiment

Figure 1:
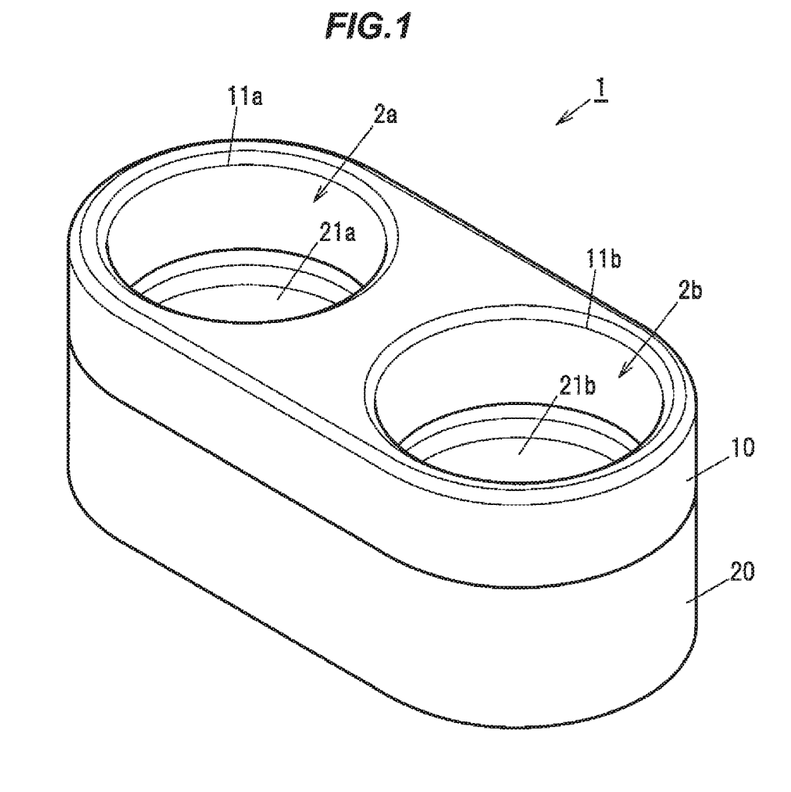
FIG. 1 is a perspective view showing a cup holder according to the first embodiment.

FIG. 1 is a perspective view showing a cup holder 1 according to the first embodiment.

Figure 2:
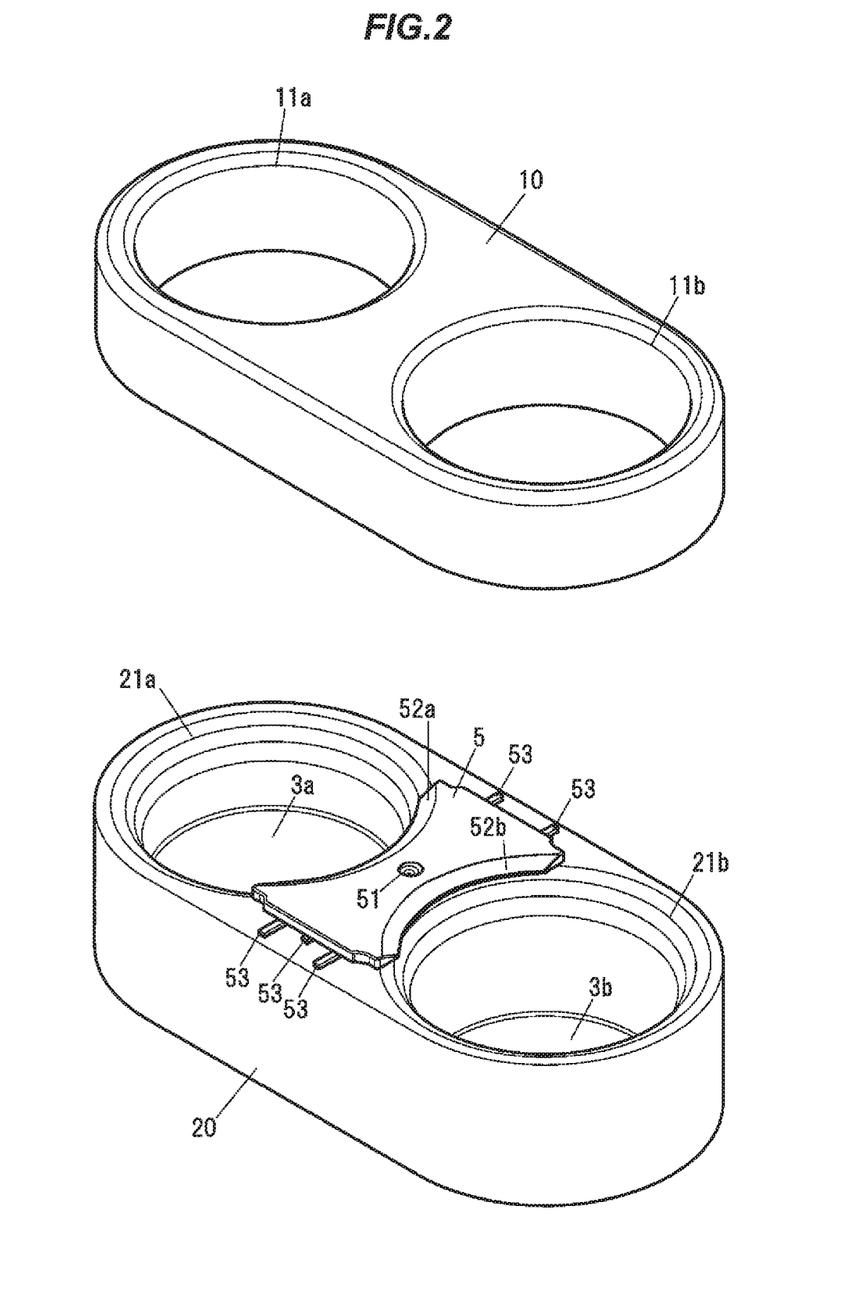
FIG. 2 is a perspective view showing the cup holder according to the first embodiment in a separate state between an upper member and a lower member of the cup holder.

FIG. 2 is a perspective view showing the cup holder 1 according to the first embodiment in a separate state between an upper member 10 and a lower member 20 of the cup holder 1.

Figure 3:
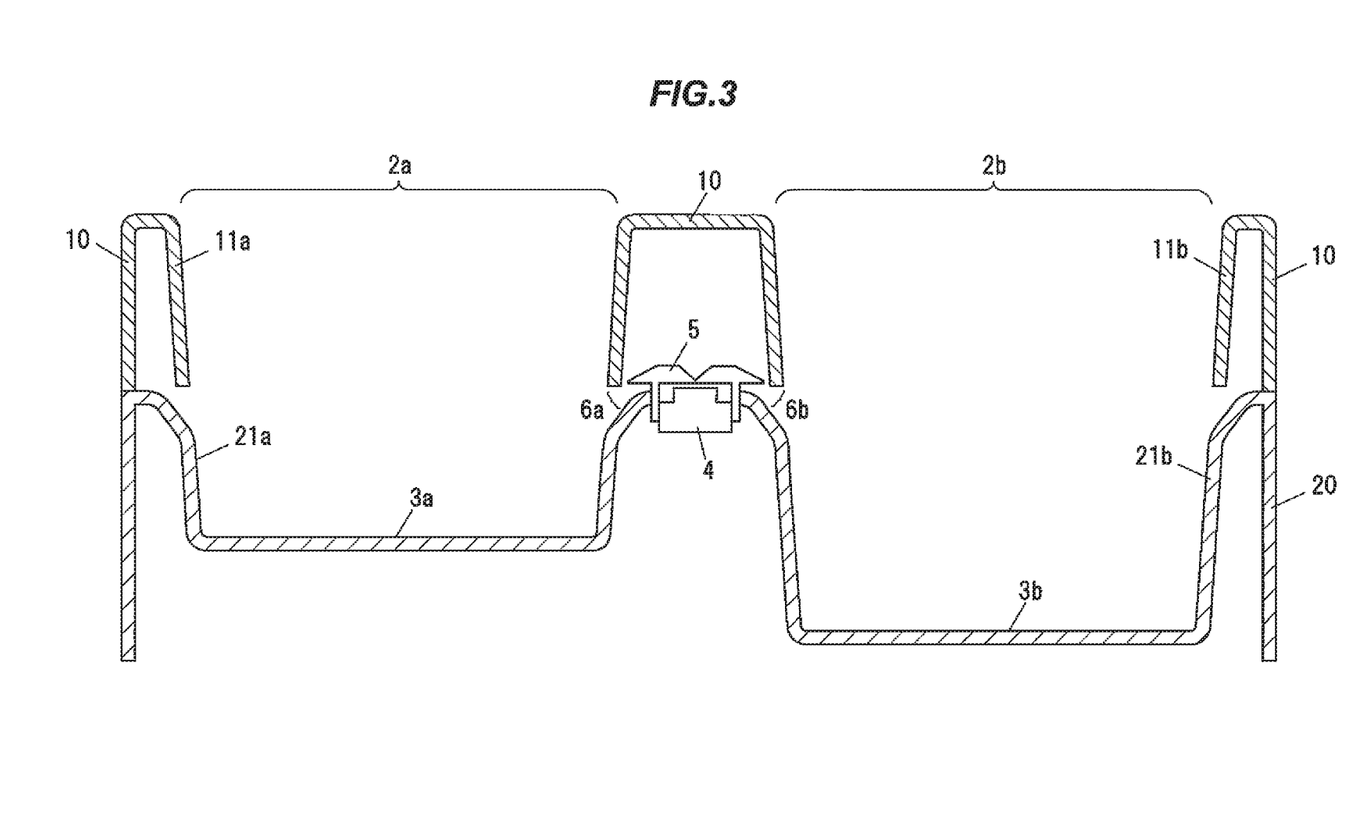
FIG. 3 is a vertical sectional view showing the cup holder according to the first embodiment.

FIG. 3 is a vertical sectional view showing the cup holder 1 according to the first embodiment.

The cup holder 1 is provided with a concave first housing portion 2a for housing a cup, and a concave second housing portion 2b for housing a cup. The first housing portion 2a and the second housing portion 2b can hold vessels such as a plastic bottle, a beverage can, and a cup. The cup holder 1 is constituted by an upper member 10 and a lower member 20 that are stacked.

The first housing portion 2a of the cup holder 1 is constituted by a first hole 11a of the upper member 10 and a first concave portion 21a of the lower member 20. The second housing portion 2b is constituted by a second hole 1ib of the upper member 10 and a second concave portion 21b of the lower member 20. A bottom portion 3a of the first housing portion 2a is a bottom portion of the first concave portion 21a of the lower member 20. A bottom portion 3b of the second housing portion 2b is a bottom portion of the second concave portion 21b of the lower member 20.

A light source 4 including light emitting elements such as a light emitting diode (LED) for illuminating the bottom portion 3a of the first housing portion 2a and the bottom portion 3b of the second housing portion 2a is provided at a convex region between the first concave portion 21a and the second concave portion 21b of the lower member 20. That is, the light source 4 is placed between the first housing portion 2a and the second housing portion 2b and at a higher position than the bottom portion 3a of the first housing portion 2a and the bottom portion 3b of the second housing portion 2b.

Although the cup holder 1 may be provided with a plurality of light sources 4 between the first housing portion 2a and the second housing portion 2b and at a higher position than the bottom portion 3a of the first housing portion 2a and the bottom portion 3b of the second housing portion 2b, it is preferable to use the single light source 4 in view of the manufacturing cost.

Furthermore, a light guide lens 5 for guiding light emitted from the light source 4 toward the bottom portion 3a of the first housing portion 2a and the bottom portion 3b of the second housing portion 2b is provided above the light source 4.

The light guide lens 5 is provided with a conical concave portion 51 provided at a center, an inclined surface 52a provided at a first housing portion 2a side surface, an inclined surface 52b provided at a second housing portion 2b side surface, and a holding portion 53 for housing the light guide lens 5 above a lower member 20 while having a space. Meanwhile, a shape of the concave portion 51 may be other pyramids such as a square pyramid and a hexagonal pyramid.

Figure 4:
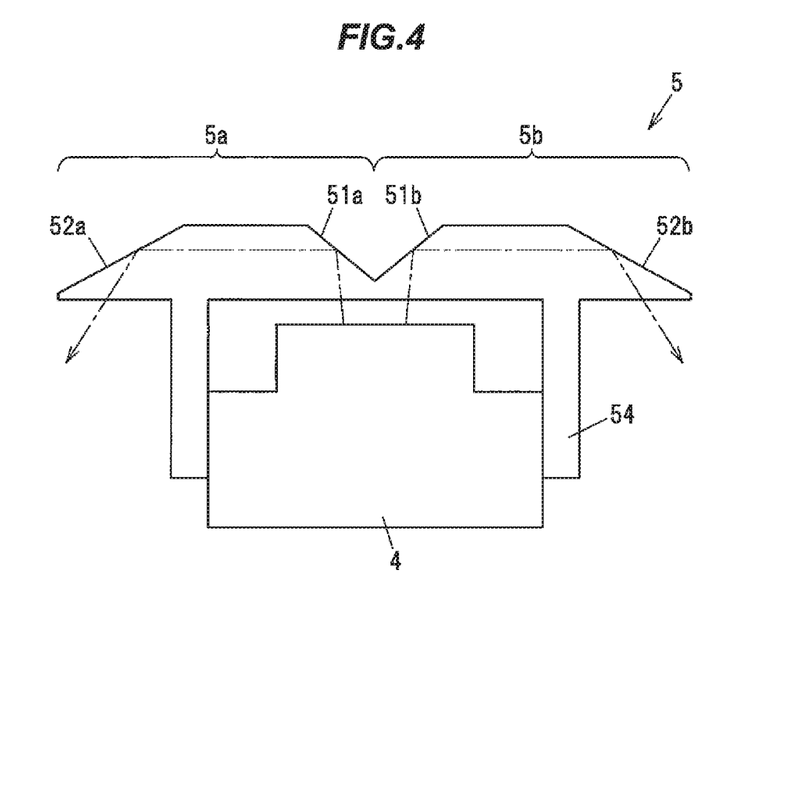
FIG. 4 is a vertical sectional view showing a light guide lens according to the first embodiment.

FIG. 4 is a vertical sectional view showing the light guide lens 5 according to the first embodiment. The light guide lens 5 has a plain plate shape. The light guide lens 5 is provided with a first region 5A guiding the light emitted from the light source 4 and entered into the light guide 5 toward the bottom portion 3a of the first housing portion 2a, which is located at a first housing portion 2a side with respect to the center, and a second region 5B guiding the light emitted from the light source 4 and entered into the light guide 5 toward the bottom portion 3b of the second housing portion 2b, which is located at a second housing portion 2b side with respect to the center. A fixing portion 54 for fixing the light guide lens 5 above the light source 4 is provided at a lower side of the light guide lens 5.

The first region 5A of the light guide lens 5 includes an inclined surface 51a reflecting the light emitted from the light source 4 and entered into the first region 5a, and an inclined surface 52a reflecting the light reflected at the inclined surface 51a and travelling in the first region 5A toward the bottom portion 3a of the first housing portion 2a.

The second region 5B of the light guide lens 5 includes an inclined surface 51b reflecting the light emitted from the light source 4 and entered into the second region 5b, and an inclined surface 52b reflecting the light reflected at the inclined surface 51b and travelling in the second region 5B toward the bottom portion 3b of the second region 5b.

Both the inclined surface 51a included in the first region 5A and the inclined surface 51b included in the second region 5B of the light guide lens 5 are a part of an inclined surface of the conical concave portion 51.

Traveling direction of the light emitted from the light source 4 is divided into the first housing portion 2a side and the second housing portion 2b side by the light guide lens 5. Then, the divided lights each reach the bottom portions 3a, 3b by passing through openings 6a, 6b.

In this case, the opening 6a is a gap between the upper member 10 and the lower member 20 that are stacked. The opening 6a is to spatially connect between a region where the light source 4 and the light guide lens 5 are provided and the first housing portion 2a. The opening 6b is a gap between the upper member 10 and the lower member 20 that are stacked. The opening 6b is to spatially connect between a region where the light source 4 and the light guide lens 5 are provided and the second housing portion 2b.

In the cup holder 1 according to the embodiment, since the height of the bottom portion 3a of the first housing portion 2a is higher than the height of the bottom portion 3b of the second housing portion 2b, the distance from the light source 4 (light guide lens 5) to the bottom portion 3a of the first housing portion 2a is shorter than the distance from the light source 4 (light guide lens 5) to the bottom portion 3b of the second housing portion 2b. Thereby, an illuminance of the bottom portion 3a of the first housing portion 2a is higher than an illuminance of the bottom portion 3b of the second housing portion 2b, where the illuminances are originally provided by light emitted from the light source 4.

Since the illuminance of the bottom portion 3a of the first housing portion 2a is different from the illuminance of the bottom portion 3b of the second housing portion 2b, the first housing portion 2a can be easily visually distinguished from the second housing portion 2b.

Second Embodiment

The second embodiment is different from the first embodiment in that an illuminance of the bottom portion 3b of the second housing portion 2b is higher than an illuminance of the bottom portion 3a of the first housing portion 2a (where the illuminances are originally provided by light emitted from the light source 4) by a shape of the light guide lens 5. Meanwhile, the construction of the cup holder 1 other than a characteristic construction in the embodiment described below may be the same as the first embodiment.

Figure 5A:
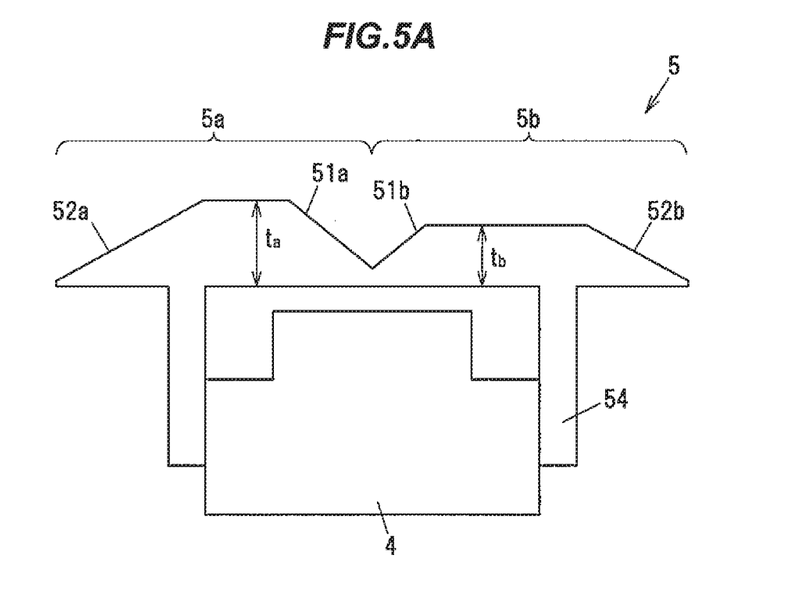
FIG. 5A is a vertical sectional view showing a light guide lens according to the second embodiment.
Figure 5B:
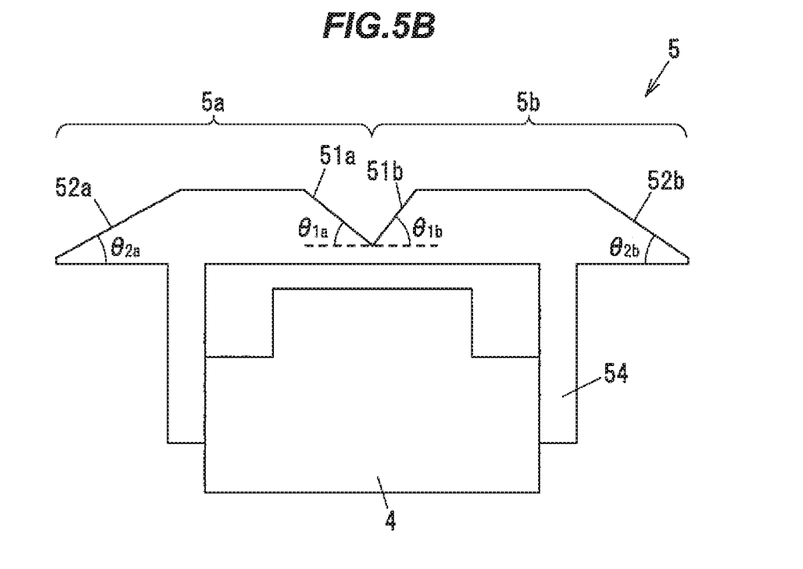
FIG. 5B is a vertical sectional view showing the light guide lens according to the second embodiment.

FIGS. 5A, 5B are vertical sectional views showing the light guide lens 5 according to the second embodiment. For the light guide lens shown in FIGS. 5A, 5B, the shape of the first region 5A and the shape of the second region 5B are asymmetrical to each other.

For the light guide lens 5 shown in FIG. 5A, since thickness $t_a$ of the first region 5A is thicker than thickness $t_b$ of the second region 5b, areas of the inclined surface 51a and the inclined surface 52a are respectively larger than areas of the inclined surface 51b and the inclined surface 52b. Thus, quantity of the light guided to the first housing portion 2a by the first region 5A is higher than quantity of the light guided to the second housing portion 2b by the second region 5b.

For the light guide lens 5 shown in FIG. 5B, an inclined angle $\theta_{1a}$ of the inclined surface 51a of the first region 5A is different from an inclined angle $\theta_{1b}$ of the inclined surface 51b of the second region 5b, and an inclined angle $\theta_{2a}$ of the inclined surface 52a of the first region 5A is different from an inclined angle $\theta_{2b}$ of the inclined surface 52b of the second region 5b.

The inclined angle $\theta_{1a}$ of the inclined surface 51a and the inclined angle $\theta_{2a}$ of the inclined surface 52a of the first region 5A are more suitable to guide light effectively than the inclined angle $\theta_{1b}$ of the inclined surface 51b and the inclined angle $\theta_{2b}$ of the inclined surface 51b of the second region 5b. Thus, the quantity of light guided to the first housing portion 2a by the first region 5A is higher than the quantity of light guided to the second housing portion 2b by the second region 5b.

Meanwhile, any one of the inclined angle θ1a and the inclined angle θ1b or the inclined angle θ2a and the inclined angle θ2b may be different. In such case, the quantity of light guided to the first housing portion 2a by the first region 5A can be higher than the quantity of light guided to the second housing portion 2b by the second region 5b.

Thus, by using the light guide lens 5 shown in FIGS. 5A, 5B, the illuminance of the bottom portion 3a of the first housing portion 2a can be much higher than the illuminance of the bottom portion 3b of the second housing portion 2b (where the illuminances are originally provided by light emitted from the light source 4) even if the height of the bottom portion 3a of the first housing portion 2a is the same as the height of the bottom portion 3b of the second housing portion 2b.

As with the first embodiment, by setting the height of the bottom portion 3a of the first housing portion 2a to be higher than the height of bottom portion 3b of the second housing portion 2b, the difference between the illuminance of the bottom portion 3a of the first housing portion 2a and the illuminance of the bottom portion 3b of the second housing portion 2b (where the illuminances are originally provided by light emitted from the light source 4) may be further increased.

Third Embodiment

The third embodiment is different from the first embodiment in that the illuminance of the bottom portion 3a of the first housing portion 2a is more than the illuminance of the bottom portion 3b of the second housing portion 2b (where the illuminances are originally provided by light emitted from the light source 4) by the light source 4 by controlling the path of light after being emitted from the light guide lens 5. Meanwhile, the construction of the cup holder 1 other than a characteristic construction in the embodiment described below may be the same as the first embodiment.

Figure 6A:
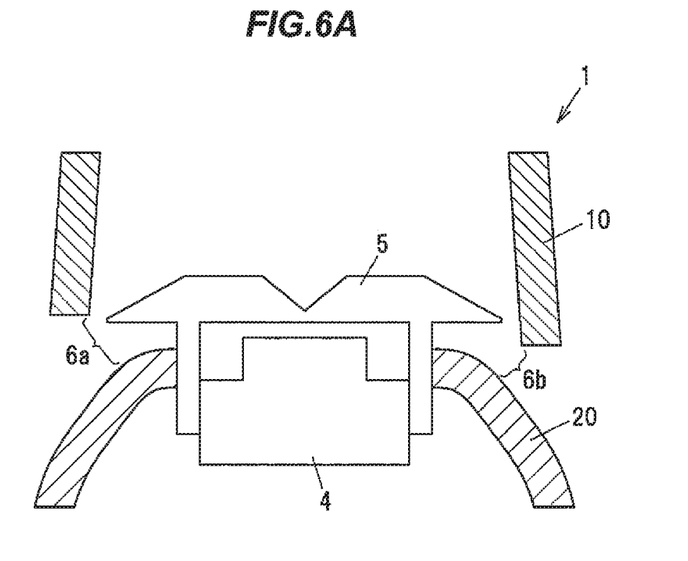
FIG. 6A is a vertical sectional view showing surround of a light guide lens of the cup holder according to the third embodiment.
Figure 6B:
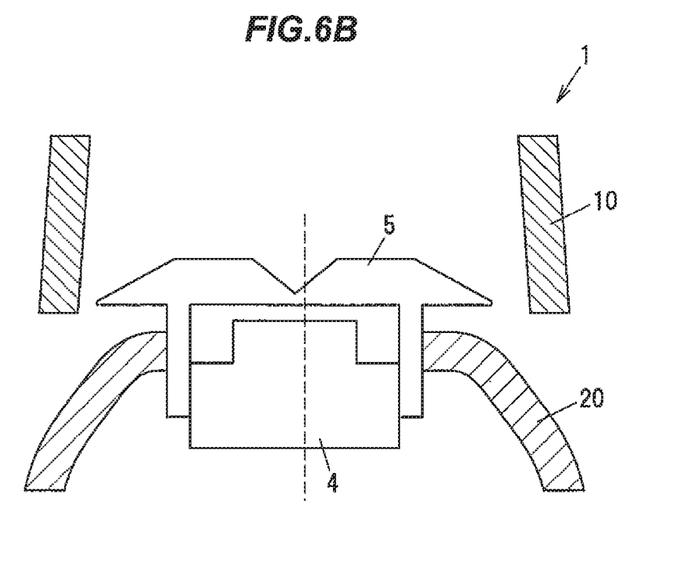
FIG. 6B is a vertical sectional view showing surround of the light guide lens of the cup holder according to the third embodiment.

FIGS. 6A, 6B are vertical sectional views showing surround of the light guide lens 5 of the cup holder 1 according to the third embodiment.

In the cup holder 1 shown in FIG. 6A, an area of the opening 6a through which a region with the light source 4 and the light guide lens 5 installed therein spatially communicates with the first housing portion 2a is more than an area of the opening 6b through which the region with the light source 4 and the light guide lens 5 installed therein spatially communicates with the second housing portion 2b. This allows the quantity of light reaching the first housing portion 2a to be more than the quantity of light reaching the second housing portion 2b after being emitted from the light guide lens 5.

In the cup holder 1 shown in FIG. 6B, the light source 4 and the light guide lens 5 are located at a position closer to the first housing portion 2a than the second housing portion 2b. The dotted line shown in FIG. 6B indicates a position of halfway point between the first housing portion 2a and the second housing portion 2b. The light source 4 and the light guide lens 5 are located at a first housing portion 2a side position with respect to the halfway point between the first housing portion 2a and the second housing portion 2b. Thus, the distance from the light source 4 (light guide lens 5) to the first housing portion 2a is shorter than the distance from the light source 4 (light guide lens 5) to the second housing portion 2b.

Accordingly, by using the constructions shown in FIGS. 6A, 6B, the illuminance of the bottom portion 3a of the first housing portion 2a can be higher than the illuminance of the bottom portion 3b of the second housing portion 2b (where the illuminances are originally provided by light emitted from the light source 4) even if the height of the bottom portion 3a of the first housing portion 2a is the same as the height of the bottom portion 3b of the second housing portion 2b.

Alternatively, as with the first embodiment, by setting the height of the bottom portion 3a of the first housing portion 2a to be higher than the height of bottom portion 3b of the second housing portion 2b, the difference between the illuminance of the bottom portion 3a of the first housing portion 2a and the illuminance of the bottom portion 3b of the second housing portion 2b (where the illuminances are originally provided by light emitted from the light source 4) can be further increased.

Meanwhile, according to the present embodiment, even if a light guide means other than the light guide lens 5 is used, the illuminance of the bottom portion 3a of the first bolder 2a can be higher than the illuminance of the bottom portion 3b of the second housing portion 2b (where the illuminances are originally provided by light emitted from the light source 4).

Effect of the Embodiment

According to the cup holder of the above first to third embodiments, the two cup housing portions can be illuminated so as to be easily visually distinguished by using the light source. Thus, although in dark vehicle interior, a cup housing portion which passenger wants to use can be determined without directly facing.

Also, by the cup holder of the above first to third embodiments, since the above effect can be obtained when using single light source, the manufacturing cost can be reduced.

Although the embodiments of the invention have been described, the invention is not to be limited to the above-mentioned embodiment. The invention can be appropriately modified and implemented without departing from the gist thereof. The invention can optionally modify elements of the above-mentioned embodiment without departing from the gist thereof.

The invention according to claims is not to be limited to the above-mentioned embodiment. It should be noted that all combinations of the features described in the embodiments are not necessary to solve the problem of the invention.

What is claimed is:

1. A cup holder, comprising:
    first and second concave housing portions to house a cup; and
    a light source to illuminate a bottom portion of the first housing portion and a bottom portion of the second housing portion, the light source being placed between the first housing portion and the second housing portion and at a higher position than the bottom portion of the first housing portion and the bottom portion of the second housing portion,
    wherein the cup holder is configured such that light emitted from the light source provides an illuminance of the bottom portion of the first housing portion that is more than an illuminance of the bottom portion of the second housing portion,
    wherein a height of the bottom portion of the first housing portion is higher than a height of the bottom portion of the second housing portion such that a distance from the light source to the bottom portion of the first housing portion is shorter than a distance from the light source to the bottom portion of the second housing portion,
    wherein the cup holder further comprises a light guide lens above the light source that guides light emitted from the light source to the bottom portion of the first housing portion and the bottom portion of the second housing portion,
    wherein the light guide lens comprises a plain plate light guide lens comprising a first region that is located closer to the first housing portion than a center of the light guide lens and that is operable to guide light emitted from the light source and entered into the light guide lens to the bottom portion of the first housing portion, and a second region that is located closer to the second housing portion than the center of the light guide lens and that is operable to guide light emitted from the light source and entered into the light guide lens to the bottom portion of the second housing portion, and
    wherein the first and second regions of the light guide lens are formed asymmetrical to each other such that the first and second regions comprise a first inclined angle and a second inclined angle, respectively, that are different from each other to differentiate in amount of light therethrough.

2. The cup holder according to claim 1, wherein an area of an opening through which a region with the light source installed therein spatially communicates with the first housing portion is more than an area of an opening through which the region with the light source installed therein spatially communicates with the second housing portion.

3. The cup holder according to claim 1, wherein the light source is located closer to the first housing portion than the second housing portion.

4. The cup holder according to claim 1, wherein the light source comprises a single light source.

* * * * *